Dec. 26, 1939. A. S. MACKEY Re. 21,310
CONTAINER STRUCTURE
Original Filed May 16, 1938
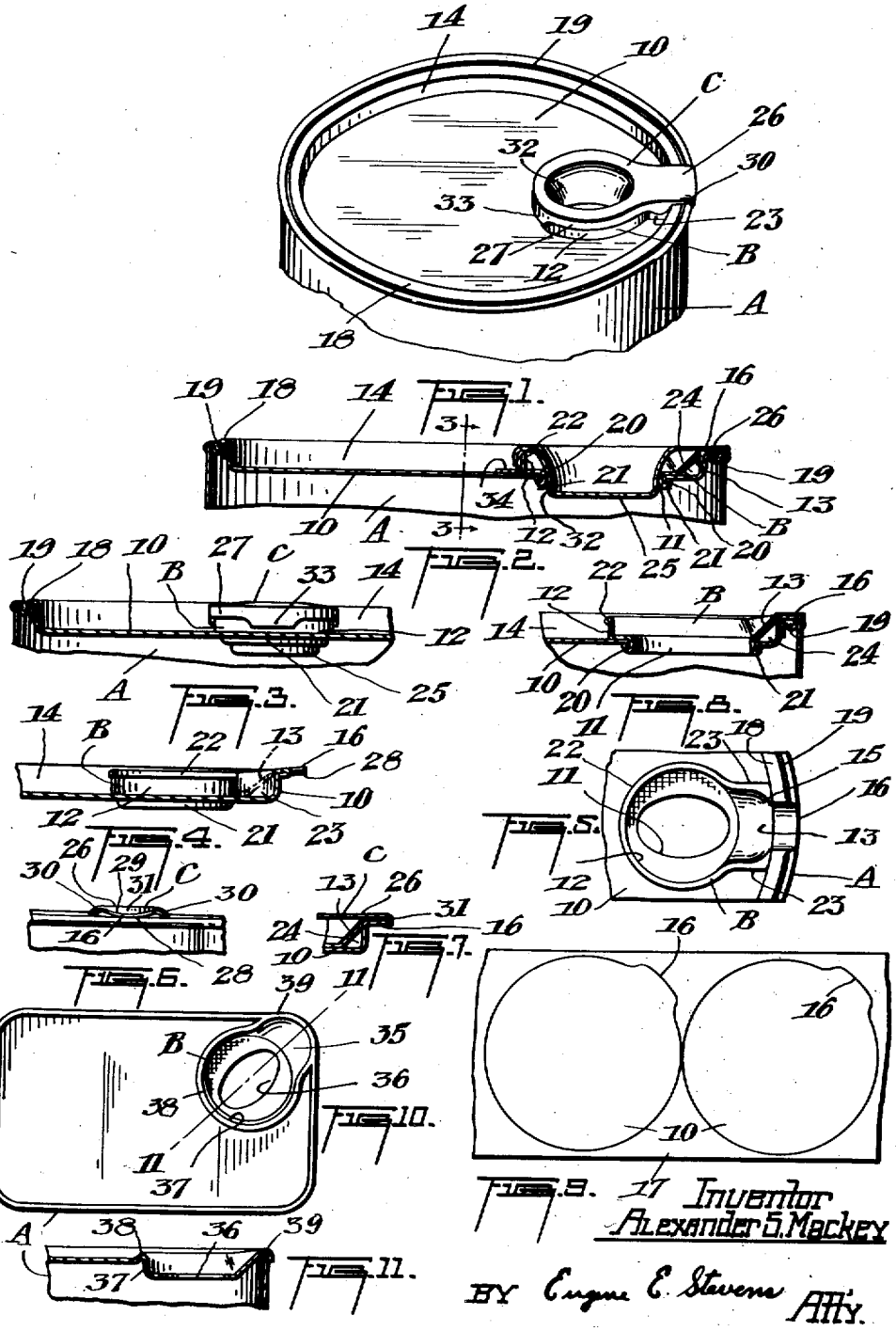
Inventor
Alexander S. Mackey
BY Eugene E. Stevens Atty.

Reissued Dec. 26, 1939

Re. 21,310

UNITED STATES PATENT OFFICE 21,310

CONTAINER STRUCTURE

Alexander S. Mackey, Clearview, Ontario, Canada, assignor, by mesne assignments, to A. E. Staley Manufacturing Company, Decatur, Ill., a corporation of Delaware Original No. 2,149,060, dated February 28, 1939, Serial No. 208,245, May 16, 1938. Application for reissue September 14, 1939, Serial No. 294,948

18 Claims. (Cl. 221—11)

This invention relates to container construction, and particularly a pouring spout structure therefor.

Up to the present time many proposals concerning pouring spout structure for containers have been proposed. These have taken various different forms. In all known instances the prior proposals have embodied structures which generally project well above the top of the container and either are permanently secured thereto or are designed to be separately fastened on the container and removable therefrom. Spout structures of this kind are disadvantageous for the reason that they prevent stacking of the containers, due to the projection of the spout they interfere with labelling operation, and apart from this in many cases rather complicated structures are involved.

Moreover, in most cases, while a stopper is provided for the spout, the spout itself is not protected so that in the case of containers filled with syrup, oil or like viscous materials, the spout remains relatively sticky following a pouring operation, and thus is subject to the accumulation of dust and foreign particles, as well as attracting insects.

It is an object of the present invention to avoid the disadvantages of the prior art by providing container construction provided with a pouring spout structure which is simple in character and which is so constructed that its upper extremities will neither project to any decided degree above the upper extremity of the container nor project beyond its side walls, thus permitting stacking or labelling or handling with the same amount of convenience as ordinary container structure.

A further object of the invention is to provide a pouring spout structure in which the stopper for the spout opening forms at the same time a complete and effective covering for the spout structure.

A still further object of the invention is to provide a structure of this character which is simple to manufacture and may be manufactured at a relatively low cost.

With these and other objects in view the invention consists essentially in a container formed with pouring spout structure on its upper end, whether or not the upper end takes the form of a removable cover or is merely an integral part of the container body. The pouring spout is rigidly carried by the top of the container and includes a defining wall surrounding a portion of the top provided with an outlet opening from the container, a portion of the wall forming a spout and sloping upwardly from the top of the container to a point substantially flush with the upper edge of the peripheral flange disposed around the top of the container, a portion of the spout structure overlying the said peripheral flange and projecting thereabove only to the extent of the thickness of thin material employed, the wall throughout being at the most no higher than the said peripheral flange. The opening from the container surrounded by the spout is closed by a stopper having formed integral therewith a cover for the pouring spout structure, whereby to enclose it completely when the stopper is in place.

In the form of container employing a general cover on the top a pouring spout structure is formed in the cover and a portion of the peripheral flange of the cover projects laterally so as to overlie the upper peripheral flange of the container and thus bridge the annular opening between the flange of the cover and the flange of the container, providing a continuous pouring spout construction which will not permit the material to drop into this space.

The invention will be fully appreciated by reference to the following specification and accompanying drawing.

In the drawing:

Figure 1 is a fragmentary perspective view of the top portion of a container showing the pouring spout construction formed in the cover for the container with the stopper and cover for the spout placed in normal position.

Figure 2 is an enlarged fragmentary section taken through the top portion of a container to show the general formation of the pouring spout construction and the manner in which the stopper cooperates therewith.

Figure 3 is an enlarged fragmentary section taken through line 3—3 of Fig. 2 to show the rearward formation of the cover for the spout.

Figure 4 is a fragmentary detail section taken through a cover for a container to show in elevation the relation between the pouring spout container and the cover, as well as the outward extension of the flange of the cover to form part of the pouring spout.

Figure 5 is a fragmentary detail of a container showing the pouring spout construction in top plan view with its cover removed.

Figure 6 is a fragmentary detail showing in front elevation the spout as it appears at the top of the container.

Figure 7 is a fragmentary detail section of the container cover illustrating the manner in which the spout structure cooperates therewith and the manner in which the cover for the spout structure engages the container cover.

Figure 8 is a fragmentary sectional detail somewhat similar to Figure 2, but with the cover for the spout removed and showing the outlet orifice from the container positioned closer to the peripheral side wall of the cover.

Figure 9 is a diagrammatic view of a strip of metal showing the manner in which a blank for the container cover is cut to provide for a lip on the cover to form part of the pouring spout construction.

Figure 10 is a top plan view of a modified form of pouring spout construction, and Figure 11 is a transverse section taken on the line 11—11 of Fig. 10.

Referring to the drawing, A indicates a container which is designed to be provided with a pouring spout construction B. The pouring spout structure is designed to be provided on the upper end of the container, whether this is an integral part of the container or generally takes the form of a removable cover. In the drawing a container with a removable cover is shown in Figures 1 to 8 and the invention will generally be described with reference to this type of structure.

Referring to Figures 1 to 8, the cover 10 of the container is provided with an outlet opening 11 through which the contents of the container may be discharged if desired. Surrounding the outlet opening is the pouring spout structure B which generally takes the form of a wall 12 suitably secured to the cover and pressed to form a sloped portion 13 which extends upwardly from the top of the cover to a point flush with and abutting the upper edge of the peripheral flange 14 of the cover. As shown particularly in Figure 5, the sloped portion 13 is also suitably curved as at 15 to form a gradually narrowing spout. The cover 10 is constructed so as to cooperate with and complete the spout portion 13. In this instance the cover blank as shown in Figure 9 is formed with a projecting lip 16 which may readily be cut from the waste portion of the metal 17 from which the blank is cut.

The lip portion 16 when the cover is pressed into its final form lies substantially in the plane of the peripheral bead 18 of the cover and projects therefrom to a desired degree, so that when the cover is pressed into the top of the container the lip 16 will bridge the intervening annular space 19 between the upper edge of the container and the bead 18 of the cover, the lip being of such a length as to terminate flush with the outer upper edge of the container. Thus, in a simple manner there is provided a pouring spout structure sloping upwardly from the top of the cover and continuing completely to the outer upper edge of the container whereby material in the container may be poured from the outlet opening 11 over the edge of the container without lodging in any other part of the upper surface of the container.

The wall 12 and general spout structure apart from the lip 16 is blanked from metal corresponding to that used for the container and then applied to the cover to form a rigid unit thereon. In this instance the opening 11 in the cover is formed with a downwardly extending peripheral flange 20, while the wall structure 12 is formed with an opening substantially corresponding to the opening 11 in the cover and by means of a projecting flange which is pressed as at 21 around the flange 20 of the cover opening the wall structure 12 is secured to the cover. This provides for a structure which is rigid with the cover and also provides a solid flange depending from the cover opening of a character firmly to receive and hold a stopper which may be projected into the discharge opening 11 for sealing purposes, as will hereinafter be referred to.

The wall 12 has a portion bent over at its upper edge as at 22 to form a reinforcing peripheral bead up to a point adjacent to the sloped portion 13 which forms a portion of the spout. At this point the wall structure is blanked with projecting aprons 23 which are bent down so as to flank the sloped portion 13 and in effect form a continuous side wall between the peripheral flange 14 of the cover for the container and the wall 12 of the spout construction. In blanking the aprons 23 they are blanked to shape so that they fit snugly against the peripheral wall 14 of the cover and the wall 12 of the spout construction so that in case any of the contents of the can should happen to drip over the wall 12 or the edges of the spout portion it cannot get under the sloped portion 13 into the space 24 (see Figures 2 and 8). Thus the spout structure provides a continuous vertical wall up to the peripheral flange 14 of the cover. This is illustrated particularly in Figure 4.

The pouring spout structure according to the present invention is provided with a cover indicated generally by the letter C. This takes the form of a piece of metal which is blanked and pressed so as to provide a stopper 25 which is formed by inwardly depressing the metal, the die being of a contour to correspond with the opening 11 formed in the container cover. The cover for the spout structure is also provided with a projecting member 26 designed to cover the outer spout portion of the structure and a downwardly projecting peripheral flange 27 is also provided so as to overlap the wall 12 of the spout structure. This flange 27 is carried right through so that it abuts the peripheral flange 14 of the cover for the container and thus it extends part way along the projecting portion 26 of the spout cover. The remaining portion of the projection 26 overlies the peripheral head of the cover for the container and the upper edge of the container itself so that in this area it is just the thickness of the metal itself.

The lip 16 of the spout portion which is formed from the flange of the cover for the container is concaved slightly during the pressing operation, as indicated at 28 (see Figure 6) and the outer end of the projection 26 of the cover for the spout may be downwardly turned and rounded as at 29 to firmly engage the lip 16 and to follow its contour. The side edges of the lip 16 are preferably bent downwardly as at 30 (see Figure 6) so as to rest upon the upper edge of the container and provide a reinforcement for this lip which will not tend to bend or distort when anything is placed on top of it. The projection 26 is bent as at 31 to coincide with the lip contour and thus the spout is completely enclosed when its cover is over it. It is apparent therefore that even though the spout may be sticky or coated following a pouring operation its cover will fully protect it from dust, insects or the like.

A stopper portion 25 of the cover C is designed for a firm pressure engagement with the solid flange depending from the opening 11 in the container cover. To this end the lower portion of the stopper may be slightly bulged outwardly as at 32 so that it will more or less snap into place. Moreover, the defining walls of the stopper portion are slightly outwardly curved and this tends to exert a firm pressing engagement. The depending flange around the opening 11 provides a sufficient area for engagement to allow for a very substantial and tight fit. It has been found that this construction will at least withstand 40 pounds pressure.

To remove the cover C for the spout structure I provide a downwardly projecting skirt 33 on a rearward portion of this member which constitutes a continuation of the flange 27. This skirt 33 projects downwardly to such an extent that it is spaced but slightly from the top surface of the cover 10 for the container so that by inserting a knife or screw driver between the top of the cover and the skirt 33 the cover structure C for the spout may be readily pried off.

In order to provide a firm base for the prying instrument and also to avoid any possible damage or disfigurement of the top of the cover a special prying base may be provided by continuing the bead 22 of the wall 12 in the area corresponding to the skirt 33 of the cover structure C so as to provide an apron 34 (see Figure 2) bent to lie on top of the surface of the cover 10. This may be easily formed in blanking out the wall structure 12.

As will be noted particularly from a consideration of Figures 1 and 8, the pouring spout structure is such that the wall 12 is at the most no higher and preferably slightly lower than the peripheral flange 14 of the cover for the container while the lip 16 projecting over the upper edge of the container is but little higher than the thickness of the metal itself. Thus, when the cover portion C for the spout structure is applied, the projecting portion 26 lying on top of the lip 16 leaves but two thin plies of metal over and above the upper edge of the container and as the cover usually projects slightly above the upper edge of the container the result is that there is but one thickness of metal projecting above the uppermost limit of the container when covered. In view of this the spout structure will not interfere with normal stacking operations as one container can be placed on top of another just as firmly as when the containers are not specially constructed with a pouring spout. Moreover, it will be noted that the lip 16 projects laterally from the cover to such an extent that it lies flush with the outer wall of the container. Thus there are no projecting parts that tend in any way to hinder the stacking of the containers or labelling since the containers can be placed in a labelling machine without the possibility of projecting parts interfering with the labelling operation.

The orifice or opening 11 in the top of the container is preferably formed oval shaped, as shown in Figure 5, as this lends readily to a satisfactory pouring operation permitting air to enter the container to cause the contents to pour out smoothly. However, any other suitably shaped opening might be employed.

In the case of containers which have a peripheral flange which is not very high, a pouring spout construction such as illustrated in Figures 10 and 11 may be employed by pressing a portion of the top of the container adjacent one corner of the latter. In this case the sloped spout portion is provided directly in line with the corner of the container, as clearly indicated at 35, whereas the general defining wall of the spout structure is formed by pressing the metal of the top of the container downwardly in an area surrounding the orifice 36, producing a wall 37 which is partially below and partially above the level of the top of the container. This provides a construction wherein the top of the wall is in the form of a bead 38 that merges with the upper peripheral edge 39 of the container and the wall construction is such, as clearly illustrated in Figure 11, that it is lower than the upper peripheral edge of the container. This modified construction is of a similar nature to that described and will not interfere with the stacking or labelling since there are no parts projecting above the outer defining edges of the container.

The structure illustrated in Figures 10 and 11 may also be provided with a cover of metal previously described and it will be realized that the projecting portion 26 of the cover for the spout structure will not project above the upper peripheral edge of the container to an extent more than the thickness of the metal. Thus, as the metal is very thin, of the order of 1/1000 of an inch and proportionately very much thinner than the illustrations in the drawing, the cover cannot interfere with normal stacking or labelling operations.

Preferably the wall of the spout structure is formed so that it slopes downwardly to a slight extent toward the center of the container and thus is lower at its inner end than at the outer. This serves to avoid any possibility of catching one can on the spout structure of another in stacking operations.

It will be realized from the foregoing that I have provided a simple, durable and serviceable spout structure for containers which will not interfere with normal handling of the container and which not only provides a handy construction for discharging the contents of the container at once or over a period of time, but in the latter case provides for a complete enclosure of the pouring spout structure so that it is sanitary, and will not permit the collection of dust on the spout structure nor tend to attract insects. At the same time the construction is such that it will permit of a tight closure at all times and also permit easy removal of the spout cover as well as permitting its easy return to normal position.

In the case where an oval opening is provided in the container top or cover the spout cover automatically seats itself in correct position and thus it is not necessary, as in the case of a round opening, to rotate the spout cover to a position where all parts fit correctly.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

I claim:

1. Container structure comprising a container having an upwardly projecting peripheral flange surrounding its top, the latter having an outlet opening therein, pouring spout structure including a defining wall positioned on the container top surrounding the outlet opening, a portion of said wall forming a spout sloping upwardly from the top of the container to a point substantially flush with the edge of the peripheral flange, said wall throughout being at the most no higher than the said peripheral flange, a cover for the pouring spout structure, having a downwardly projecting portion forming a stopper designed to fit within the opening in the top of the container, and an outwardly projecting portion designed to cover the spout, said cover being flanged to encase a major portion of the upper edge of said spout structure.

2. Container structure comprising a container having an upwardly projecting flange surrounding its top, the latter having an outlet opening therein, pouring spout structure including a defining wall surrounding the outlet opening and formed by pressing the container top, whereby said wall extends below and above the plane of the container top, the upper edge of said wall being at the most no higher than the peripheral flange on the container top, a portion of said wall being offset and sloped to form a spout, the outer defining edge of said offset sloped portion abutting the peripheral flange of the container top at a point no higher than the upper edge of said flange.

3. Container structure comprising a container of rectangular form having rounded corners and formed with an upwardly projecting peripheral flange surrounding its top, pouring spout structure formed on said top including a defining wall integral with the top and formed by pressing said top whereby said wall extends below and above the plane of the container top, the upper edge of said wall being at the most no higher than the peripheral flange on the cover, a portion of said wall being offset and sloped to form a spout, said offset sloped portion being located at an angle to the plane of the defining walls of said container, the outer defining edge of said offset portion abutting the peripheral flange of the container top at a point no higher than the said peripheral flange and at a point coinciding with one of the curved corners of the container whereby to form a curved pouring lip, said container top being provided with an opening within the confines of the peripheral wall of the spout structure to permit the contents of the container to be discharged therefrom via the pouring spout.

4. Container construction comprising a container having an upwardly projecting peripheral flange surrounding its top, the latter having an opening therein, pouring spout structure mounted on the container top including an upstanding wall surrounding said opening, a portion of said wall being offset and sloped to form a spout, said offset and sloped portion abutting the peripheral flange of the container top and being at the most no higher than said peripheral flange, and downwardly projecting skirts integral with and flanking the offset and sloped portion of said wall, and extending between and abutting the peripheral flange of the container and the said wall to enclose the sides of said sloped portion and in effect forming a continuation of said wall up to the container flange.

5. Container structure comprising a container having an upwardly projecting peripheral flange surrounding its top and a removable cover designed to be mounted on the container so that its upper edge is substantially flush with the upper edge of said peripheral flange, said cover having an integral lip designed to overlap said peripheral flange of the container and to project to a point flush with the outer periphery of said flange, pouring spout construction mounted on said cover aligned with said lip, the latter forming a portion of the spout.

6. The device as claimed in claim 5, in which the pouring spout construction is closed by a cover having a downwardly projecting portion forming a stopper and an outwardly projecting portion designed to cover the spout construction including said lip and said spout cover being flanged to encase a major portion of the upper edge of said spout construction.

7. Container structure comprising a container having an upwardly projecting peripheral flange surrounding its top and a removable cover designed to be mounted on the container so that its upper edge is substantially flush with the upper edge of said peripheral flange, said cover having an integral lip designed to overlap said peripheral flange of the container and to project to a point flush with the outer periphery of said flange, pouring spout construction mounted on said cover aligned with said lip, the latter forming a portion of the spout, the surface of said lip being downwardly pressed and curved to provide a defined pouring channel and a cover for said spout construction including a downwardly pressed portion forming a stopper to fit in said outlet opening, and an outwardly projecting portion designed to cover the spout including said lip, the outer end of said projecting portion terminating flush with the end of lip and having a downwardly bent portion curved to abut the curved pouring channel of the lip thereby enclosing said spout structure completely.

8. The device as claimed in claim 7 in which the side edges of the lip and the side edges of the cooperating cover are downwardly bent to bear upon the peripheral flange of the container, whereby to reinforce said lip and spout structure against downward pressure or weight.

9. Container structure comprising a container having an upwardly projecting peripheral flange surrounding its top and a removable cover designed to be mounted on the container so that its upper edge is substantially flush with the upper edge of said peripheral flange, said cover having an integral lip designed to overlap said peripheral flange of the container and to project to a point flush with the outer periphery of said flange, pouring spout construction mounted on said cover aligned with said lip, the latter forming a portion of the spout, the surface of said lip being downwardly pressed and curved to provide a defined pouring channel and a cover for said spout construction including a downwardly pressed portion forming a stopper to fit in said outlet opening, and an outwardly projecting portion designed to cover the spout including said lip, the outer end of said projecting portion terminating flush with the end of the lip, a portion of the flange of said cover being downwardly projected adjacent to and spaced from the container cover and forming an apron permitting the spout cover to be pried from its mounting on the spout structure.

10. The device as claimed in claim 9 in which a portion of the walled spout structure is bent upon itself and bent to project from said structure and to lie upon a portion of the cover for the container, said bent projecting portion being disposed in an area underlying the prying apron but spaced therefrom, said bent projecting portion forming a prying base for a prying tool to be brought into engagement with the prying apron.

11. Container structure comprising in combination a container having an upwardly projecting peripheral flange surrounding its top, the latter having an outlet opening therein, pouring spout structure including a defining wall positioned on the container top surrounding the outlet opening, a portion of said wall forming a spout sloping upwardly from the top of the container to a point substantially flush with the edge of the peripheral flange, said wall throughout being at the most no higher than the said peripheral flange, and a cover closing said opening and engaging said wall including a downwardly pressed projecting portion forming a stopper to fit within the outlet opening, and a projecting portion designed to overlap said wall and to cover said spout, said cover being flanged to engage said wall and encase a major portion of the upper edge of said spout construction.

12. The device as claimed in claim 11 in which a portion of the flange of the spout cover is downwardly projected adjacent to and spaced from the container top and forms an apron permitting the spout cover to be pried from its mounting on the spout structure.

13. Container structure comprising a container having a peripheral flange surrounding its top and a friction cover opening spaced inwardly therefrom, a friction cover seated in said opening and having an inner upstanding peripheral flange, and pouring spout structure mounted on said friction cover and of a height substantially no greater than said flanges, said pouring spout structure including a lip extending over both of said flanges.

14. Container structure comprising a container having an upwardly projecting flange surrounding its top, the latter having an outlet opening therein, pouring spout structure including a defining wall adjacent the outlet opening and formed by pressing the container top, the upper portion of said wall being formed by an upstanding bead extending above the top but substantially no higher than the peripheral flange on the container top, and a portion of said top being offset to form a spout having an outer defining edge abutting the peripheral flange of the container top at a point no higher than the upper edge of the flange, and a lip portion extending from adjacent said sloped portion across the top of said flange.

15. Container structure comprising a container having an upwardly projecting peripheral flange surrounding its top, the latter having an outlet opening spaced inwardly from said flange, and pouring spout structure including a defining wall adjacent the outlet opening and formed by pressing the container top, the upper portion of said wall being composed of an upstanding bead extending above the top but substantially no higher than the peripheral flange on the container top, and said spout structure also including a lip portion extending over said peripheral flange.

16. Container structure comprising a container having an upwardly projecting peripheral flange surrounding its top, a removable cover having an upwardly projecting peripheral flange and designed to be mounted on the container top, said cover having an integral lip extending from its peripheral flange and designed to overlap the peripheral flange of said container, and pouring spout structure on said cover in alignment with said lip, the latter forming a portion of the spout.

17. Container structure comprising a container having a peripheral rim surrounding its top and a friction cover opening spaced inwardly therefrom, a friction cover seated in said opening and having an upstanding peripheral flange positioned inwardly of said rim, a lip member integral with said flange extending over said rim, and pouring spout structure on said cover in alignment with said lip.

18. Container structure comprising a container having a peripheral rim surrounding its top and a friction cover opening spaced inwardly therefrom, a friction cover seated in said opening and having an upstanding peripheral flange positioned inwardly of said rim, and pouring spout structure on said cover and including a lip extending over said flange and said rim, said structure including an upstanding wall encompassing a pouring opening in said cover and a sloped portion extending from said cover upwardly adjacent said lip.

ALEXANDER S. MACKEY.